United States Patent Office 3,064,046
Patented Nov. 13, 1962

3,064,046
OXIDATION OF ORGANIC COMPOUNDS
Arthur William Charles Taylor and Fred Dean, Norton-on-Tees, England, assignors to Imperial Chemical Industries Limited, London, England, a corporation of Great Britain
No Drawing. Filed Aug. 1, 1958, Ser. No. 752,413
Claims priority, application Great Britain Aug. 23, 1957
8 Claims. (Cl. 260—523)

This invention relates to the production of oxygenated organic compounds and in particular aromatic dicarboxylic acids.

According to the present invention there is provided a process for the production of ortho-phthalic acid or iso-phthalic acid which comprises oxidising the corresponding toluic acid or formyl toluene in the presence of ortho-phthalic anhydride in the liquid phase by means of molecular oxygen or ozone in the presence of an oxidation catalyst and in the substantial absence of halogen while continuously removing water of reaction as vapour.

The ortho-phthalic anhydride may be introduced as such or may be formed in situ from ortho-phthalic acid.

Air oxidation of organic compounds has already been described in which catalysts comprising a metal of variable valence and halogen, e.g., bromine are used. Unlike that process the present one is conducted in the substantial absence of halogen, and gives high yields and conversions for a process not using halogen. Suitable oxidation catalysts comprise, for example, lead, vanadium, cerium, nickel, manganese, and cobalt, which can be employed as their inorganic or organic salts, such as the acetates and naphthenates. Manganese and cobalt, separately or in admixture are especially effective.

The oxygen may be introduced as such, or as air, or diluted air, or if desired ozonated air may be used.

It is a considerable advantage to operate in the absence of halogen because the corrosive effect of the reaction mixture on metal is considerably decreased. Hence on the one hand the plant has much longer life, and on the other the inhibiting effect of the corrosion products on the reaction is also decreased.

For the production of iso-phthalic acid according to the present invention the process is conducted under such conditions of reactant concentration, temperature, pressure and rate of water removal that substantially no ortho-phthalic acid is allowed to persist in the system. Under these conditions any ortho-phthalic acid formed is decomposed to ortho-phthalic anhydride, which remains in the system as a reaction component, and iso-phthalic acid is formed as a final reaction product and is filtered off.

As a desirable feature the oxidation is conducted within a range of the aforesaid reaction conditions simultaneously favourable to anhydride exchange between meta-toluic acid, present initially or formed in the reaction and ortho-phthalic anhydride, and also to dehydration of ortho-phthalic acid to ortho-phthalic anhydride, which serves to maintain the desired concentration of this reactant in the reaction zone. Suitable conditions are, for example, a molar ratio of ortho-phthalic anhydride to meta- or ortho-toluic acids of tolualdehydes, of from 1:2 to 6:1 and a temperature of from 180° to 300° C., preferably about 200° C. Below 180° C. the reaction rate is slow, above 300° C. there is increasing tendency for by-product formation. Atmospheric pressure is preferred, but if desired superatmospheric pressure, e.g. up to 10 atmospheres gauge may be used. The aforesaid ratio may be as high as 10:1 but this is wasteful of reaction volume.

Without committal the reaction mechanism may possibly be as follows. When the molar ratio of meta-toluic acid to ortho-phthalic anhydride is greater than 1:1 two moles of meta-toluic acid are envisaged as reacting with one mole of ortho-phthalic anhydride and one mole of ortho-phthalic acid under the operating conditions used, this ortho-phthalic acid dehydrates to ortho-phthalic anhydride which serves to maintain the desired concentration of this component in the reaction zone while the meta-toluic anhydride which is readily oxidisable under the reaction conditions is converted to iso-phthalic anhydride and the mixed anhydride of iso-phthalic and meta-toluic acids, which are hydrolysed respectively by the water present in the system to isophthalic acid, and iso-phthalic and meta-toluic acids. The isophthalic acid so produced is filtered off and the meta-toluic acid is available for oxidation. When the molar ratio of meta-toluic acid to ortho-phthalic anhydride is equal to or less than 1:1, 1 mole of meta-toluic acid is envisaged as reacting with 1 mole of ortho-phthalic anhydride to give one mole of the mixed anhydride of meta-toluic acid and ortho-phthalic acid. This, on oxidation, yields the mixed anhydride of isophthalic acid and ortho-phthalic acid, which on hydrolysis with the water present in the system gives isophthalic acid and ortho-phthalic acid.

Oxidation as described above is advantageous because the process is single stage and thus economic in cost of equipment.

In the case of ortho-toluic acid or ortho-tolualdehyde the phthalic anhydride product remains in solution and is removed by withdrawal from the reaction system and subsequent isolation and purification by known methods, e.g. by hydrolysis to ortho-phthalic acid and recovery of the latter by filtration and washing with a light hydrocarbon or ether.

Example 1

40 grams of meta-toluic acid in admixture with 200 grams of ortho-phthalic anhydride, 0.15 gram of cobalt acetate, $Co(OOCCH_3)_2.4H_2O$ and 0.30 gram of manganese acetate, $Mn(OOCCH_3)_2.4H_2O$, was subjected to oxidation in a stirred glass reactor at 200° C. and atmospheric pressure with molecular oxygen fed at a rate of 12 litres per hour (measured at atmospheric pressure and temperature) through the hollow shaft of a rapidly rotating cruciform stirrer. The reactor was provided with a distillation column and there was a Dean and Stark decanter in the exit gas line from the column, and the water was continuously removed from the reactor as vapour.

After 40 hours the process was stopped, crude iso-phthalic acid was filtered off from the hot reaction product, and on extracting this with acetone there was obtained 5.1 grams of isophthalic acid (purity by acid value, 96.1%). The molar conversion to desired product was 10.4%.

Example 2

100 grams of ortho-toluic acid together with 100 grams of ortho-phthalic anhydride, 0.15 gram of cobalt acetate, $Co(OOCCH_3)_2.4H_2O$, and 0.3 gram of manganese acetate, $Mn(OOCCH_3).4H_2O$, is subjected in a reactor provided with a distillation column and a cruciform stirrer to oxidation in the liquid phase at 200° C. and atmospheric pressure by means of a stream of oxygen fed through the hollow shaft of the stirrer at the rate of 12 litres per hour (measured at atmospheric pressure and temperature). Oxygen is absorbed and the water evolved is removed as steam through the heated distillation column which is provided with a Dean and Stark decanter in the exit gas line therefrom.

The process is stopped after 40 hours. On hydrolysing the hot reaction product with water at 200° C., filtering, washing with petroleum ether, and drying, there is obtained 130.7 grams of ortho-phthalic acid. Since the original reaction mixture contained 100 grams of ortho-phthalic anhydride equivalent to 112.2 grams of acid, therefore 18.5 grams of ortho-phthalic acid is produced by oxidation, which corresponds to a molar pass yield of 15.2% of the theoretical.

We claim:

1. An oxidation process which comprises passing an oxygen-containing gas through a toluene derivative selected grom the group consisting of ortho- and meta-toluic acids and ortho- and meta-formyl toluenes at a temperature of about 180° to 300° C. under halogen-free conditions, in the presence of ortho-phthalic anhydride and an oxidation catalyst which consists essentially of a member selected from the group consisting of salts of leads, vanadium, cerium, nickel, manganese, and cobalt, and a mixtuer of salts of manganese and cobalt, the molar ratio of ortho-phthalic anhydride to said toluene derivative being between about 1:2 and 6:1, and continuously removing water of reaction as vapor.

2. Process as claimed in claim 1 in which the said ratio is in excess of 1:1.

3. Process as claimed in claim 1 in which the oxidation is conducted at about 200° C.

4. Process as claimed in claim 1 in which the ortho-phthalic anhydride is introduced as such.

5. Process as claimed in claim 1 in which ortho-phthalic acid is fed to the process and the ortho-phthalic anhydride is produced in situ under the reaction conditions.

6. Process as claimed in claim 1 in which the catalyst consists essentially of a salt of manganese.

7. Process as claimed in claim 1 in which the catalyst consists essentially of a salt of cobalt.

8. Process as claimed in claim 1 in which the catalyst consists essentially of a mixture of salts of cobalt and manganese.

References Cited in the file of this patent

UNITED STATES PATENTS

| | | |
|---|---|---|
| 2,727,919 | Saunders | Dec. 20, 1955 |
| 2,764,611 | Katzschmann | Sept. 25, 1956 |